(12) United States Patent
Feigl et al.

(10) Patent No.: US 6,325,380 B1
(45) Date of Patent: Dec. 4, 2001

(54) FACE SEAL ASSEMBLY

(75) Inventors: Peter Feigl, Höhenrain; Bernd Plewnia, Geretsried, both of (DE)

(73) Assignee: Feodor Burgmann Dichtungswerke GmbH & Co., Wolfratshausen (DE)

(*) Notice: Subject to any disclaimer, the term of this patent is extended or adjusted under 35 U.S.C. 154(b) by 0 days.

(21) Appl. No.: 09/570,525

(22) Filed: May 16, 2000

(30) Foreign Application Priority Data

May 20, 1999 (DE) .......................................... 299 08 918 U

(51) Int. Cl.[7] ...................................................... F16J 15/34
(52) U.S. Cl. ............................................. 277/352; 277/400
(58) Field of Search ..................................... 277/348, 352, 277/361, 364, 400

(56) References Cited

U.S. PATENT DOCUMENTS

| | | | |
|---|---|---|---|
| 5,071,141 | * | 12/1991 | Lai et al. ................................ 277/400 |
| 5,531,458 | * | 7/1996 | Sedy ...................................... 277/400 |
| 6,213,472 | * | 4/2001 | Bondarenko et al. ................. 277/400 |

* cited by examiner

Primary Examiner—Robert J. Sandy
Assistant Examiner—Karlena D. Schwing

(57) ABSTRACT

A face seal assembly comprises a pair of co-operating seal rings of which one is provided for mounting on a rotary component and the other on a stationary component. The seal rings have substantially radially aligned seal faces between which during operation a seal gap is provided for sealing a zone peripherally outward of the seal faces relative to a zone peripherally inward thereof. A plurality of peripherally spaced recesses effective for pumping a gas are provided in at least one of the seal faces, said gas recesses extending from one periphery of the seal face towards, but the of ends said recesses being radially spaced from, the other periphery thereof. A surface area ratio $F_{GFA}/F_G$ g in a range between 0.35 and 0.65, preferably 0.4 and 0.6 is provided on the seal face having said gas recesses. $F_{GFA}$ is the total surface area of the gas recesses as a projection onto the seal face, and $F_G$ is the total surface area of the seal face.

10 Claims, 1 Drawing Sheet

FACE SEAL ASSEMBLY

BACKGROUND OF THE INVENTION

1. Field of the Invention

The invention relates to a face seal assembly. The invention relates in particular, but not exclusively, to a face seal assembly suitable for sealing the drive shaft of a charge compressor in an internal combustion engine relative to a compressor housing.

2. Description of the Related Art

Particular attention has to be paid in regard to the special operating conditions when sealing the drive shaft of e.g. an. turbine-driven centrifugal or screw compressor or a turbocompressor driven by an exhaust gas loaded turbine. For instance the drive shafts of such compressors generally have a very small diameter, e.g. less than 40 mm. These shafts rotate at very high speeds of e.g. $10^5$ min$^{-1}$ and more. Further the seal may be subjected to pressures above as well as below atmospheric pressure conditions prevailing in the housings of such compressors. Moreover the gaseous medium to be sealed, which is generally air, must be kept free of non-gaseous constituents such as oil particles. Oil particles may be contained in a portion of the compressor located externally of the compressor housing for accomodating roller bearings or the like for supporting the shaft, relative to which portion the interior of the compressor has to be sealed. In view of the critical operating conditions, labyrinth seals have long been preferred for such applications although labyrinth seals have the inherent disadvantage of a relatively high leakage. A face seal assembly has not yet been take into consideration as alternative to labyrinth seals for such applications despite of the much lower leakage of face seals. It has been found that the seal rings of prior face seal assemblies because of a dry running became so hot that a premature break-down of the seal occurred. Similar results were obtained with prior face seal assemblies when these were subjected to negative pressure conditions and the operating speeds significantly reduced.

An object of the invention is to provide an improved face seal assembly. Another object of the invention is to provide a face seal assembly having minimum danger of dry running and a reduced leakage under operating pressures above as well as below atmospheric pressure conditions. Still another object of the invention is to provide a face seal assembly suitable for sealing the shafts of turbo compressors having a small diameter.

SUMMARY OF THE INVENTION

A face seal assembly in accordance with the present invention includes a pair of co-operating seal rings of which one is provided for mounting on a rotary component and the other on a stationary component. The seal rings have substantially radially aligned seal faces, during operation a seal gap is provided therebetween for sealing a zone peripherally outward of the seal faces relative to a zone peripherally inward thereof. A plurality of peripherally spaced recesses effective for pumping a gas is provided in at least one of said seal faces, said recesses extending from one periphery of the seal face towards the other periphery thereof, but the ends of said recesses being radially spaced from, the latter. On the said one seal face comprising said recesses a surface area ratio $F_{GFA}/F_G$ is provided, which is in a range between 0.35 and 0.65, preferably 0.4 and 0.6, wherein $F_{GFA}$=the total surface area of the recesses when seen as a projection onto the seal face, and $F_G$=the total surface area of the seal face.

In particular, the invention envisages that the number of recesses effective for pumping a gas (hereinafter also gas recesses) present in the seal face of one of the seal rings is such that the surface area occupied by these gas recesses occupies approximately 35 to 65% of the total surface area of the seal face. In contrast to conventional face seal assemblies, this means a very large number of gas recesses provided in the seal face. Moreover the portions of the seal face free of gas recesses are reduced to a minimum. Thus, the ratio of the radial dimension of a recesses-free dam portion relative to the radial dimensions of the seal face may be only approximately 0.2 to 0.3, whereas the dam portion in conventional face seal assemblies occupies a substantially greater part of the seal face. As a consequence of the present invention it is ensured that a stable gas cushion is formed between the co-operating seal faces in every operational state, etc., even when the face seal assembly is subjected to a low pressure by the medium (air) to be sealed. Furthermore, in accordance with a preferred embodiment of the invention, a load ratio k, defined as the ratio of an effective surface area of the face seal assembly hydraulically loaded by the pressure of the medium to be sealed to the total surface area of the seal face, should lie in a range between 0.5 and 1.2. The load ratio k should be in the lower part of the range for low pressure conditions and in the upper part for overpressure conditions. Moreover, in order to ensure that any non-gaseous constituents included in the gases do not enter into a space which is to be sealed, from the outer environment, it is preferred that the gas recesses originate at the inner periphery of the seal face. This causes a leakage current to always flow from this space in a direction towards the outer environment and not vice versa. It also prevents non-gaseous constituents from getting between the seal faces which could lead to operational disturbances of the face seal assembly. The entry of non-gaseous constituents into the face seal assembly can be reduced still further by a means for retaining non-gaseous constituents, which is disposed upstream of the side of the face seal assembly remote from the medium to be sealed.

For a more complete understanding of the invention and the objects thereof, reference should be made to the accompanying drawing and the following detailed description wherein a preferred embodiment of the invention is illustrated and described.

DESCRIPTION OF THE PREFERRED EMBODIMENT

Although the invention will be described hereinafter in connection with the sealing of the drive shaft of a charge compressor of an internal combustion engine, it should be understood that the invention is not restricted to this application. Rathermore, the invention can always be used to advantage wherever a shaft of comparably small diameter and driven at a high rotational speed needs to be sealed relative to a housing in a manner such as to minimize friction, and the medium that is to be sealed is a gas such as air. However, the invention also has advantages in regard to the sealing of relatively slowly rotating shafts of large diameter in machinery where low pressure conditions prevail, e.g. in gearing of heavy duty diesel propulsion units.

Figure 2:
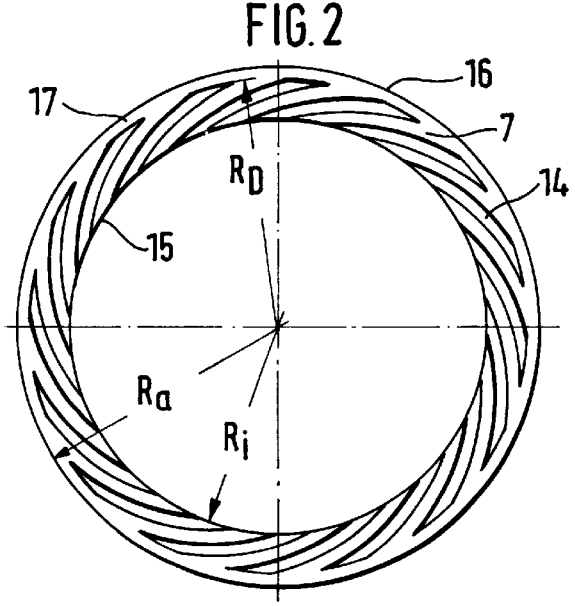
FIG. 2 is a top view of a seal face of one of a pair of seal rings of the face seal assembly in accordance with the present invention shown in FIG. 1.

The face seal assembly of the present invention comprises a seal ring 3 held non-rotationally on a housing 1 (indicated schematically in the drawing), and a seal ring 5 mounted on a shaft 2 so as to rotate therewith. The seal ring 3 is disposed co-axially of the shaft 2 and moveable in the axial direction thereof. The seal rings 3, 5 have substantially radial, opposed seal faces 6, 7. Direction-of-rotation dependent structures or recesses 14 effective for pumping a gas, c.f. FIG. 2, are provided in at least one of the seal faces 6, 7, preferably in the seal face 7 of the non-rotational seal ring 3, using known techniques such as grinding, lasering or stamping. These gas recesses 14 are effective for pumping a gas between the seal faces 6, 7 when the shaft 2 rotates so that a pressure is built up and a gas cushion is formed between the seal faces 6, 7 for sealing a zone A peripherally inward of the seal faces 6, 7 relative to a zone B peripherally outward thereof. Basically, gas recesses 14 of this type are known. In regard to the details reference can be made to e.g. page 16 et seq of BURGMANN, Gas lubricated mechanical seals, 1997, self-published, ISBN 3-929682-15-X. Direction-of-rotation dependent gas recesses of differing type may be used if desired.

The non-rotational seal ring 3 is accommodated in a driving casing 11 mounted stationarily on the compressor housing 1 in a not-illustrated manner, and is sealed there against by a secondary seal 4 in the form of an O-ring. In regard to the details of an O-ring type secondary seal and appropriate materials therefor, reference may be made to pages 161, 272–273 of BURGMANN, ABC der Gleitringdichtung, 1988, self-published. Other type of secondary seal than an O-ring may be provided, if desired.

Figure 1:
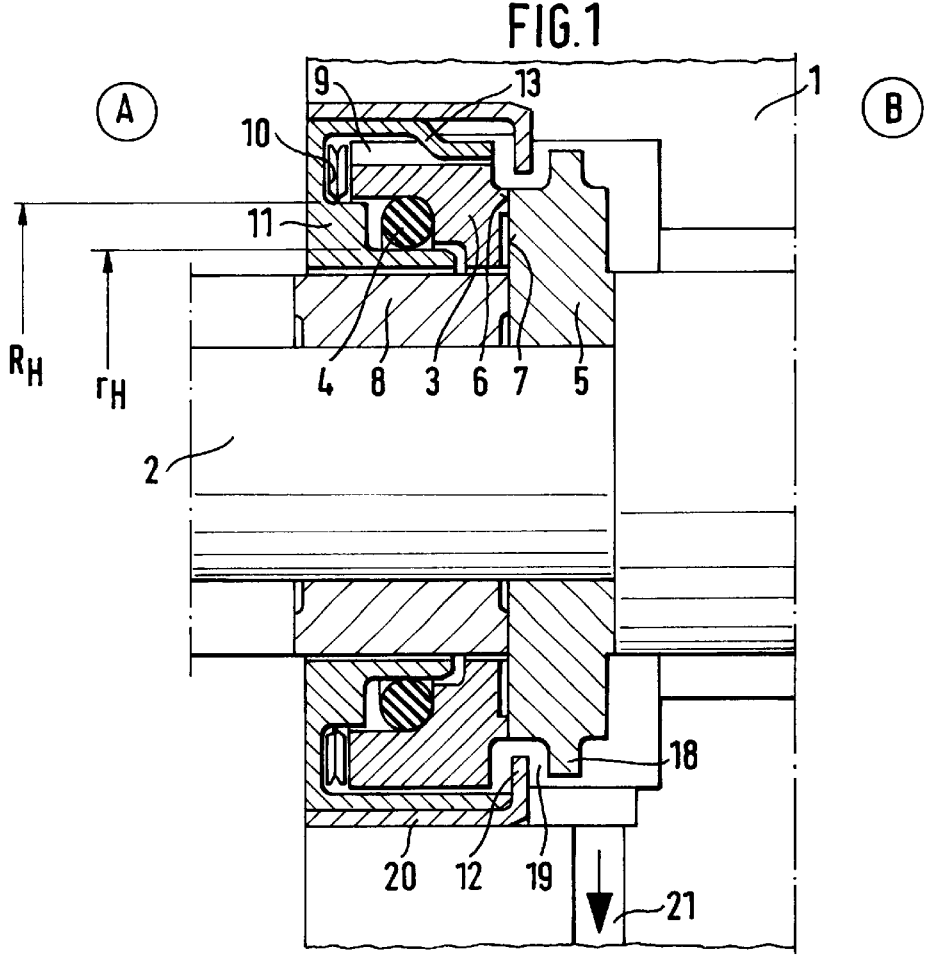
FIG. 1 is a longitudinally sectioned view of a face seal assembly in accordance with the present invention mounted in a bore of a compressor housing for sealing a drive shaft.

A biasing means 10 that may be in the form of an corrugated washer spring arrangement is disposed between the driving casing 11 and the non-rotational seal ring 3, as shown in FIG. 1. The biasing means 10 urges the non-rotational seal ring 3 against the seal ring 5 rotating with the shaft 2 with a suitable bias force so that the seal faces 6, 7 of the seal rings 3, 5 are held together in sealing engagement when the shaft 2 is stationary. In the outer periphery of the non-rotational seal ring 3, an axially extending groove 9 is provided (a plurality of such grooves, distributed peripherally, could be provided), into which a driving finger 13 extends, that protrudes radially from the driving casing 11 towards the seal ring 3. The non-rotational seal ring 3 is thereby prevented from rotating relative to the driving casing 11 but is allowed to move axially relative thereto.

The rotary seal ring 5 may be mounted on the shaft 2 in any appropriate manner. In the present embodiment, it is clamped between a shoulder of the shaft and a bushing 8 seated on the shaft 2 so that the rotation of the shaft 2 is transferred to the seal ring 5 without slippage.

The preferred materials for the rotary seal ring 5 are highly strong materials such as silicon carbide (SiC), silicon nitride ($SI_3N_4$), tungsten carbide (WC) or titanium (Ti) with or without a coating on the seal face. In the case of SiC materials, preference is given to the use of a fine-grained material sintered in the fluid phase and having a grain size of $\leq 1$ µm. Instead of the aforesaid materials for the rotary seal ring 5, a metallic material such as a chrome-molybdenum high-grade steel may be advantageous for some applications. The stationary seal ring 3 may also be made from any of the aforesaid materials. However, in order to minimise wear, tribologically effective materials such as carbon materials are preferred, these may be impregnated with antimony using known techniques if desired.

As shown in FIG. 2, a large number of the gas recesses 14 is provided which are evenly distributed in the seal face 7 of the non-rotational seal ring 3. Each gas recess 14 extends from the inner periphery 15 of the seal face 7, curved in the manner of a plough blade, up to a radial intermediate portion RD of the seal face 7 radially spaced from the outer periphery 16 thereof, thereby leaving a dam portion 17 near the outer periphery 16 which is free of gas recesses 14.

In accordance with the invention, the ratio of the surface area $F_{GFA}$ covered by the gas recesses 14 to the total surface area $F_G$ of the seal face 7 is such that direct contact between the seal faces 6, 7 is avoided both in normal operation as well as when starting and during stopping of the shaft 2 even when the shaft has a very small diameter of e.g. 8 to 25 mm, this being done by forming a gas cushion therebetween with the aid of the gas recesses 14. In accordance with the invention, it has been found that these effects are obtained when the surface area ratio $F_{GFA}/F_G$ is in a range between 0.35 and 0.65, preferably 0.4 and 0.6. Furthermore it has been found that the radial dimensions ($R_a-R_i$) of the seal face 7 should not drop below a minimum. On the other hand, the radial dimensions ($R_a-R_D$) of the dam portion 17 should be kept to a minimum. The ratio ($R_{a-RD}$)/($R_{a-Ri}$) should lie in the range between 0.2 and 0.3. For example, ($R_a-R_i$) may be 3.5 mm and ($R_a-R_D$) 1 mm for sealing a shaft 2 having a nominal diameter of e.g. 16 mm. As an example, sixteen gas recesses 14 having plough-blade-like leading and trailing edges may be provided around the periphery of a seal face 7 of this type.

It has further been found that particularly advantageous operational properties of the face seal assembly arc obtained if a load ratio k, defined as the ratio of an effective surface area $F_H$ of the face seal assembly hydraulically loaded by the pressure of the medium to be sealed to the surface area $F_G$ of the seal face, is in a range of $$F_H/F_G=0.5 \text{ to } 1.2$$

wherein $$F_H/F_G=(R_a^2-r_H^2)/(R_a^2-R_i^2), \text{ when} p_A<p_B,$$

and $$F_H/F_G=(R_H^2-R_i^2)/(r_a^2-R_i^2), \text{ when} p_A>p_B$$

Here, $R_a$=radius of the outer periphery of the seal face 7, $R_i$=radius of the inner periphery of the seal face 7, and $R_H$, $r_H$=hydraulically effective radii. The hydraulically effective radius differs in dependence on whether the pressure $p_A$ of the medium is greater than or less than the counteracting pressure $p_B$ e.g. the pressure at the atmospheric side. The radii $R_H$ and $r_H$ are defined by the interaction of the O-ring 4 with the adjacent peripheral surfaces of the non-rotational seal ring 3 or the driving casing 11, with which the O-ring 4 comes into sealing engagement under the prevailing pressure conditions, and correspond essentially to the respective outer and inner radial dimensions of the O-ring 4.

The load factor k should be in a range between 0.5 and 0.9, preferably 0.6 and 0.8, when $p_A<p_B$ i.e. when low pressure prevails on the side occupied by the medium to be sealed. By contrast, the load factor k should amount to between 0.7 and 1.2, preferably 0.8 and 1.0, when $p_A>p_B$ i.e. when the medium to be sealed is at overpressure.

The reason why the gas recesses 14 should preferably originate from the inner periphery 15 of the seal face 7 is that the medium to be scaled in the zone A is practically free of non-gaseous constituents e.g. oil particles, such particles being capable of causing damage to the face seal assembly in case they enter the seal gap. By contrast, although the number of non-gaseous constituents e.g. oil particles in the gaseous medium on the atmospheric side e.g. the air in the space B is very small, it is not negligible, since lubricated roller bearings etc for supporting the shaft 2 may be accommodated in the space B. The location of the gas recesses 14 at the inner periphery of the seal face 7 ensures that a leakage current of the medium to be scaled occurs from the space A along the seal gap between the seal faces 6, 7 towards the space B, and thereby effectively prevents non-gaseous constituents infiltrating space A from space B.

Furthermore, means may be provided in the space B, upstream of the face seal assembly, for preventing, or at least substantially reducing access of oil particles to the seal faces 6, 7 of the seal rings 3, 5. Although other suitable means could be provided, a preferred means comprises a flange-like portion 12 which extends radially from a bushing 20 surrounding the outer periphery of the driving casing 11, said portion 12 extending from beyond the outer periphery of the seal rings 3, 5 centrally within an externally open annular groove which is axially bounded by an end face of the non-rotational seal ring 3 and a disc-like cap 18 on the outer periphery of the rotary seal ring 5. Accordingly a U-shaped flow passage 19 is formed having an inlet located at a greater radial spacing from the central axis of the face seal assembly than a point where the flow turns near the free end of the flange-like portion 12. The centrifugal forces prevailing in the flow passage 19 will therefore continuously spin oil particles back towards the inlet of the flow passage 19 and thereby prevent them from entering the region near the seal faces 6, 7. The precipitated oil particles being deposited around the periphery of the boring in the housing can, if desired, be continuously fed away to the exterior through a passage 21 provided in the housing 1.

Although the invention has been described hereinabove with referende to an embodiment in which the gas recesses extend from the inner periphery of the seal face, a reversal of the situation could also be envisaged should there be no fear of access of non-gaseous constituents from the space B into the space A through the seal gap. Furthermore, the gas recesses may be formed in the seal face of the rotary seal ring instead of the seal face of the non-rotary seal ring, or they may be formed in seal faces of both of the seal rings.

What is claimed is:

1. A face seal assembly including a pair of co-operating seal rings, one of said seal rings being provided for mounting on a rotary component and the other on a stationary component, said seal rings having substantially radially aligned seal faces in operation providing a seal gap therebetween for sealing a zone peripherally outward of the seal faces relative to a zone peripherally inward thereof, a plurality of peripherally spaced recesses effective for pumping a gas (hereinafter gas recesses) being provided in at least one of said seal faces, said gas recesses extending from one periphery of said seal face towards the other periphery thereof, while the inner ends of said gas recesses being radially spaced from the other periphery of said seal face, wherein for said seal face having said gas recesses a surface area ratio $F_{GFA}/F_G$ being provided, which is in a range between 0.35 and 0.65, preferably 0.4 and 0.6, wherein $F_{GFA}$=the total surface area of the gas recesses when projected onto the seal face, and $F_G$=the total surface area of the seal face.

2. The face seal assembly according to claim 1, wherein at least the rotary seal ring is made of a material of a group comprising silicon carbide (SiC), silicon nitride ($SI_3N_4$), tungsten carbide (WC) and titanium (Ti).

3. The face seal assembly according to claim 1, wherein the stationary seal ring is made of carbon material.

4. The face seal assembly according to claim 1 and further having a load ratio k, defined as the ratio of an effective surface area $F_H$ of the face seal assembly hydraulically loaded by the pressure of the medium to be sealed to the surface area $F_G$ of the seal face, is in a range between 0.5 and 1.2.

5. The face seal assembly according to claim 4, wherein the load ratio k is in a range between 0.5 and 0.9, preferably 0.6 and 0.8, for a sealing pressure below a counter pressure, and between 0.7 and 1.2, preferably 0.8 and 1.0, for a sealing pressure above a counter pressure.

6. The face seal assembly according to claim 1, wherein the gas recesses originate from the inner periphery of the seal face.

7. The face seal assembly according to claim 1 and further including means for retaining non-gaseous constituents, said retaining means being provided upstream of a side of the face seal assembly remote from the medium to be sealed.

8. The face seal assembly according to claim 7, wherein said retaining means comprises a flow passage defined between rotating and stationary portions of the face seal assembly, said passage having an inlet disposed at a radially greater distance from a center longitudinal axis of the face seal assembly than an intermediate transition portion of the flow passage leading to the seal faces.

9. A face seal assembly including a pair of co-operating seal rings, one of said seal rings being provided for mounting on a rotary component and the other on a stationary component, said seal rings having substantially radially aligned seal faces in operation providing a seal gap therebetween for sealing a zone peripherally outward of the seal faces relative to a zone peripherally inward thereof, a plurality of peripherally spaced recesses effective for pumping a gas (hereinafter gas recesses) being provided in at least one of said seal faces, said gas recesses extending from one periphery of said seal face towards the other periphery thereof, while the inner ends of said gas recesses being radially spaced from the other periphery of said seal face, wherein for said seal face having said gas recesses a surface area ratio $F_{GFA}/F_G$ being provided, which is in a range between 0.35 and 0.65, preferably 0.4 and 0.6, wherein $F_{GFA}$=the total surface area of the gas recesses when projected onto the seal face, and $F_G$=the total surface area of the seal face, and wherein a load ratio k, defined as the ratio of an effective surface area $F_H$ of the face seal assembly hydraulically loaded by the pressure of the medium to be sealed to the surface area $F_G$ of the seal face, is in a range between 0.5 and 1.2.

10. The face seal assembly according to claim 9, wherein said load ratio k is in a range between 0.5 and 0.9, preferably 0.6 and 0.8, for a sealing pressure below a counter pressure, and between 0.7 and 1.2, preferably 0.8 and 1.0, for a sealing pressure above a counter pressure.

* * * * *

EX PARTE REEXAMINATION CERTIFICATE (6013th)

United States Patent
Feigl et al.

(10) Number: US 6,325,380 C1
(45) Certificate Issued: Nov. 20, 2007

(54) FACE SEAL ASSEMBLY

(75) Inventors: Peter Feigl, Höhenrain (DE); Bernd Plewnia, Geretsried (DE)

(73) Assignee: Burgmann Industries GmbH & Co. KG, Wolfratshausen (DE)

Reexamination Request:
No. 90/007,875, Jan. 17, 2006

Reexamination Certificate for:
Patent No.: 6,325,380
Issued: Dec. 4, 2001
Appl. No.: 09/570,525
Filed: May 16, 2000

(30) Foreign Application Priority Data

Jul. 29, 1999 (DE) .................... 299 08 918 U

(51) Int. Cl.
*F16J 15/34* (2006.01)

(52) U.S. Cl. ........................ 277/352; 277/400
(58) Field of Classification Search ........... 277/352, 277/400, 348, 361, 364
See application file for complete search history.

(56) References Cited

U.S. PATENT DOCUMENTS

| 3,640,541 | A | 2/1972 | Taschenberg |
| 4,212,475 | A | 7/1980 | Sedy |
| 5,503,407 | A | 4/1996 | McNickle |
| 5,893,564 | A | 4/1999 | Yang |
| 6,325,380 | B1 | 12/2001 | Feigl et al. |

FOREIGN PATENT DOCUMENTS

| DE | 3901362 A1 | 7/1990 |
| DE | 298 10 759 U1 | 10/1998 |
| JP | 41-20007 | 11/1966 |
| JP | 48-76342 | 12/1973 |
| JP | 62-31775 | 7/1985 |
| JP | 62-028569 | 7/1985 |
| JP | 60-126762 | 8/1985 |
| JP | 61-113998 | 7/1986 |
| JP | 3-84480 | 8/1991 |

OTHER PUBLICATIONS

English translation of EPO Communication dated Apr. 16, 2004.
English translation of EPO Communication dated Jan. 13, 2005.
English translation of Response filed in European Patent Office Nov. 16, 2004.
English translation of Response filed in European Patent Office Jun. 28, 2005.

*Primary Examiner*—Matthew C. Graham

(57) ABSTRACT

A face seal assembly comprises a pair of co-operating seal rings of which one is provided for mounting on a rotary component and the other on a stationary component. The seal rings have substantially radially aligned seal faces between which during operation a seal gap is provided for sealing a zone peripherally outward of the seal faces relative to a zone peripherally inward thereof. A plurality of peripherally spaced recesses effective for pumping a gas are provided in at least one of the seal faces, said gas recesses extending from one periphery of the seal face towards, but the of ends said recesses being radially spaced from, the other periphery thereof. A surface area ratio $F_{GFA}/F_G$ g in a range between 0.35 and 0.65, preferably 0.4 and 0.6 is provided on the seal face having said gas recesses. $F_{GFA}$ is the total surface area of the gas recesses as a projection onto the seal face, and $F_G$ is the total surface area of the seal face.

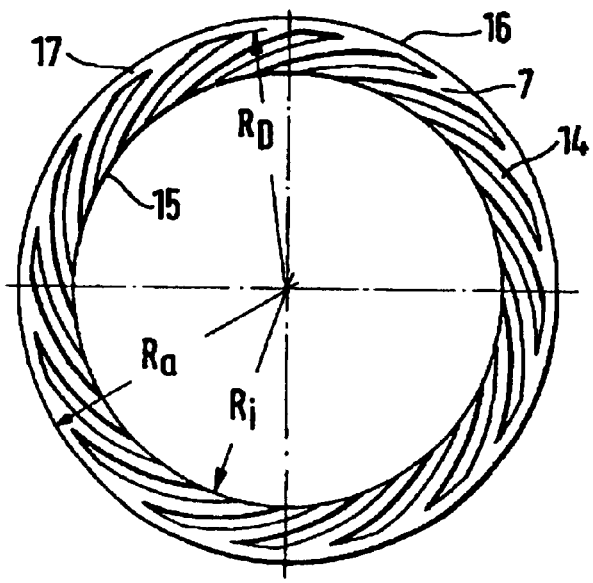

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are cancelled.

Claims 2–6 and 8–10 are determined to be patentable as amended.

New claims 11–27 are added and determined to be patentable.

2. The face seal assembly according to claim [1] *8*, wherein at least the rotary seal ring is made of a material of a group comprising silicon carbide [(SiC)], silicon nitride [($Si_3N_4$)], tungsten carbide [(WC)] and titanium [(Ti)].

3. The face seal assembly according to claim [1] *8*, wherein the stationary seal ring is made of carbon material.

4. The face seal assembly according to claim [1] *8* and further having a load ratio k, defined as the ratio of an effective surface area $F_H$ of the face seal assembly hydraulically loaded by the pressure of the medium to be sealed to the surface area $F_G$ of the seal face, is in a range between 0.5 and 1.2.

5. The face seal assembly according to claim 4, wherein the load ratio k is in a range between 0.5 and 0.9[, preferably 0.6 and 0.8,] for a sealing pressure below a counter pressure, and between 0.7 and 1.2[, preferably 0.8 and 1.0,] for a sealing pressure above a counter pressure.

6. The face seal assembly according to claim [1] *8*, wherein the gas recesses originate from the inner periphery of the seal face.

8. [The] *A* face seal assembly [according to claim 7,] *including:*
   a) *a pair of co-operating seal rings, one of said seal rings being provided for mounting on a rotary component and the other on a stationary component, said seal rings having:*
      i) *substantially radially aligned seal faces in operation providing a seal gap therebetween for sealing a zone peripherally outward of the seal faces relative to a zone peripherally inward thereof,*
      ii) *a plurality of peripherally spaced gas recesses effective for pumping a gas being provided in at least one of said seal faces, said gas recesses extending from one periphery of said seal face towards the other periphery thereof, with the inner ends of said gas recesses being radially spaced from the other periphery of said seal face,*
      iii) *wherein for said seal face having said gas recesses a surface area ratio $F_{GFA}/F_G$ being provided, which is in a range between 0.35 to 0.65, wherein $F_{GFA}$=the total surface area of the gas recesses when projected onto the seal face, and $F_G$=the total surface area of the seal face,*
   b) *the face seal assembly further including means for retaining non-gaseous constituents, said retaining means being provided upstream of a side of the face seal assembly remote from a medium to be sealed, and*
   c) *wherein said retaining means comprises a flow passage defined between rotating and stationary portions of the face seal assembly, said passage having an inlet disposed at a radially greater distance from a center longitudinal axis of the face seal assembly than an intermediate transition portion of the flow passage leading to the seal faces.*

9. A face seal assembly including a pair of co-operating seal rings, one of said seal rings being provided for mounting on a rotary component and the other on a stationary component, said seal rings having substantially radially aligned seal faces in operation providing a seal gap therebetween for sealing a zone peripherally outward of the seal faces relative to a zone peripherally inward thereof, a plurality of peripherally spaced *gas* recesses effective for pumping a gas [(hereinafter gas recesses)] being provided in at least one of said seal faces, said gas recesses extending from one periphery of said seal face towards the other periphery thereof, while the inner ends of said gas recesses being radially spaced from the other periphery of said seal face, wherein for said seal face having said gas recesses a surface area ratio $F_{GFA}/F_G$ being provided, which is in a range between 0.35 and 0.65[, preferably 0.4 and 0.6,] wherein $F_{GFA}$=the total surface area of the gas recesses when projected onto the seal face, and $F_G$=the total surface area of the seal face, and wherein a load ratio k, defined as the ratio of an effective surface area $F_H$ of the face seal assembly hydraulically loaded by the pressure of [the] *a* medium to be sealed to the surface area $F_G$ of the seal face, is in a range between 0.5 and 1.2, *the face seal assembly further including means for retaining non-gaseous constituents, said retaining means being provided upstream of a side of the face seal assembly remote from the medium to be sealed, wherein said retaining means includes a flow passage defined between rotating and stationary portions of the face seal assembly, said passage having an inlet disposed at a radially greater distance from a center longitudinal axis of the face seal assembly than an intermediate transition portion of the flow passage leading to the seal faces.*

10. The face seal assembly according to claim 9, wherein said load ratio k is in a range between 0.5 and 0.9[, preferably 0.6 and 0.8,] for a sealing pressure below a counter pressure, and between 0.7 and 1.2[, preferably 0.8 and 1.0], for a sealing pressure above a counter pressure.

11. *A face seal assembly comprising:*
   a) *a pair of co-operating seal rings, one of the seal rings being adapted and configured for mounting on a rotary component of a device and the other seal ring being adapted and configured for mounting on a stationary component of the device, the seal rings having:*
      i) *substantially radially aligned seal faces that, in operation, provide a seal gap therebetween for sealing a zone peripherally outward of the seal faces relative to a zone peripherally inward of the seal faces; and*
      ii) *a plurality of peripherally spaced gas recesses defined in at least one of the seal faces, the gas recesses being adapted and configured to pump a gas between the seal faces during operation of the* device, the gas recesses extending from a first periphery of the seal face towards a second periphery of the seal face, the inner ends of the gas recesses being radially spaced from the second periphery of the seal face, wherein a surface area ratio $F_{GFA}/F_G$ is defined for the seal face having said gas recesses which is in a range between 0.35 and 0.65 wherein $F_{GFA}$=the total surface area of the gas recesses when projected onto the seal face, and $F_G$=the total surface area of the seal face; and b) means for retaining non-gaseous constituents, the retaining means being located upstream of a side of the face seal assembly remote from a medium to be sealed, wherein the retaining means includes a flow passage defined between rotating and stationary portions of the face seal assembly, the passage having an inlet disposed at a radially greater distance from a center longitudinal axis of the face seal assembly than an intermediate transition portion of the flow passage leading to the seal faces.

12. A face seal assembly as recited in claim 11, wherein the face seal assembly is adapted and configured for sealing the drive shaft of a charge compressor relative to a compressor housing.

13. A face seal assembly as recited in claim 11, wherein at least the rotary seal ring is composed of material selected from the group consisting of silicon carbide, silicon nitride, tungsten carbide and titanium.

14. A face seal assembly as recited in claim 11, wherein the stationary seal ring is composed of carbon material.

15. A face seal assembly as recited in claim 11, wherein the face seal assembly is defined by a load ratio k, the load ratio k being defined as the ratio of an effective surface area $F_H$ of the face seal assembly hydraulically loaded by the pressure of the medium to be sealed to the surface area $F_G$ of the seal face, and further wherein the load ratio is in a range between 0.5 and 1.2.

16. A face seal assembly as recited in claim 15, wherein the load ratio k is in a range between about 0.5 and 0.9 for a sealing pressure below a counter pressure.

17. A face seal assembly as recited in claim 15, wherein the load ratio k is in a range between about 0.6 and 0.8 for a sealing pressure below a counter pressure.

18. A face seal assembly as recited in claim 15, wherein the load ratio k is in a range between about 0.7 and 1.2 for a sealing pressure above a counter pressure.

19. A face seal assembly as recited in claim 15, wherein the load ratio k is in a range between about 0.8 and 1.0 for a sealing pressure above a counter pressure.

20. A face seal assembly as recited in claim 11, wherein the gas recesses originate from the inner periphery of the seal face.

21. The face seal assembly of claim 8, wherein the surface area ratio $F_{GFA}/F_G$ is between about 0.4 and 0.6.

22. The face seal assembly of claim 5, wherein the load ratio k is in a range between about 0.6 and 0.8 for a sealing pressure below a counter pressure.

23. The face seal assembly of claim 5, wherein the load ratio k is in a range between about 0.8 and 1.0 for a sealing pressure above a counter pressure.

24. The face seal assembly of claim 9, wherein the surface area ratio $F_{GFA}/F_G$ is between 0.4 and 0.6.

25. The face seal assembly of claim 9, wherein the load ratio k is in a range between about 0.6 and 0.8 for a sealing pressure below a counter pressure.

26. The face seal assembly of claim 9, wherein the load ratio k is in a range between about 0.8 and 1.0 for a sealing pressure above a counter pressure.

27. The face seal assembly of claim 11, wherein the surface area ratio $F_{GFA}/F_G$ is between about 0.4 and 0.6.

* * * * *